Nov. 29, 1955 W. I. JONES 2,724,884
FASTENING DEVICE
Filed March 30, 1951

INVENTOR:
WALTER I. JONES,
BY Robert E Ross
AGENT.

United States Patent Office 2,724,884
Patented Nov. 29, 1955

2,724,884

FASTENING DEVICE

Walter I. Jones, Belmont, Mass., assignor, by mesne assignments, to United-Carr Fastener Corporation, Boston, Mass., a corporation of Delaware Application March 30, 1951, Serial No. 218,302

5 Claims. (Cl. 24—213)

This invention relates generally to fastening devices, and has particular reference to a snap fastener for attachment to a supporting sheet through an opening therein.

The object of the invention is to provide a one piece snap fastener having integral means disposed thereon for attachment to a supporting sheet.

A further object of the invention is to provide a one piece snap fastener having a base with a fastening portion disposed centrally thereof, in which an integral attaching means is provided on the base in spaced relation to the periphery thereof which extends substantially continuously about the fastening portion.

A further object of the invention is to provide a fastening device formed of a single piece of molded synthetic organic thermoplastic material in which a base having a fastening means disposed centrally thereof is provided with an attaching wall which extends substantially continuously about the fastening means in spaced relation to the periphery of the base.

A still further object of the invention is to provide a fastener assembly comprising a supporting sheet and a one piece fastener assembled into an opening therein, in which the fastener is provided with a central fastening portion and substantially continuous retaining portions disposed thereabout on both sides of the supporting sheet.

Other objects of the invention will, in part, be obvious, and will in part, appear hereinafter.

Figure 1:
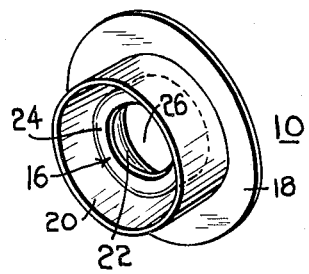
Fig. 1 is a perspective view of a snap fastener socket member embodying the features of the invention.
Figure 2:
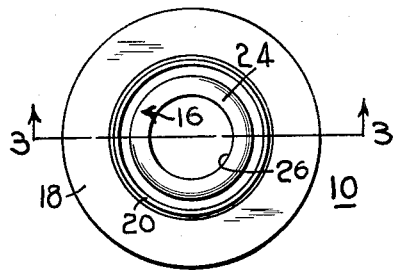
Fig. 2 is a top plan view of the fastener of Fig. 1.
Figure 3:
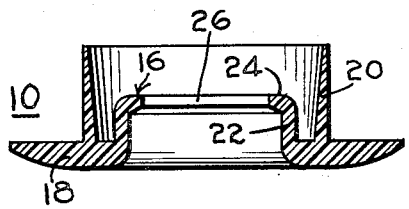
Fig. 3 is a view in section taken on line 3—3 of Fig. 2.

Referring to the drawing, there is illustrated a snap fastener member 10 which is adapted for attachment to a supporting sheet 12 formed of cloth, paper, plastic sheet, or the like, which is preferably provided with a preformed opening 14 to receive the fastener 10.

The fastener 10 may be formed of any material capable of meeting the requirements to appear hereinafter, and in the preferred embodiment is formed of a single piece of molded synthetic organic plastic such as cellulose acetate. Other types of plastics may be used provided they are sufficiently flexible to withstand deformation occurring during the attaching process. In some cases the fastener 10 may also be formed of metal.

The fastener 10 comprises generally a central fastening portion 16, a flange or base 18 disposed about the fastening portion, and an attaching portion 20 disposed on the flange about the fastening portion. The central fastening portion is shaped to provide a snap fastener socket portion comprising an upstanding cylindrical stud-receiving portion 22 having an inwardly extending peripheral shoulder portion 24 forming a central restricted stud-receiving aperture 26. The attaching portion 20, in the preferred embodiment, is in the shape of a substantially continuous wall which is integral with the flange 18 and is disposed thereon in spaced relation to the outer periphery thereof.

Figure 6:
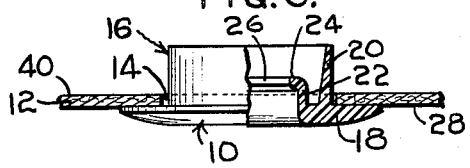
Fig. 6 is a view in elevation, partly in section, illustrating the first step in the assembly of the snap fastener socket member onto a supporting sheet.
Figure 7:
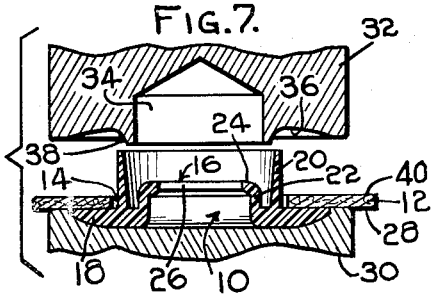
Fig. 7 is a view of the assembly of Fig. 6 in position in an attaching mechanism for completing the attachment of the fastener to the supporting sheet.
Figure 9:
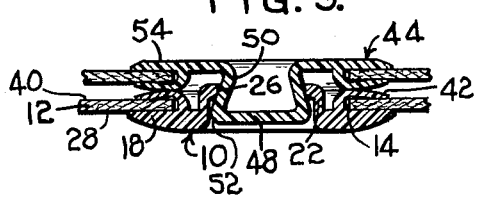
Fig. 9 is a view in elevation, partly in section, of the attached stud and the attached socket snapped into engagement with each other.
Figure 8:
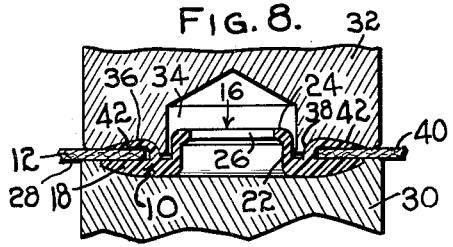
Fig. 8 is a view similar to Fig. 7, in which is shown the final step in the attachment of the fastener to the sheet.

The method of assembly of the fastener 10 with the supporting sheet 12 is best illustrated by reference to Figs. 6 through 8. As shown in Fig. 6, the fastener 10 is initially assembled with the sheet so that the attaching portion 20 extends through the opening 14 in the sheet, and the flange 18 bears against one side 28 of the sheet. Thereafter the assembly is placed on the base plate 30 of the attaching mechanism (see Fig. 7) with the flange 18 resting thereon, and a die 32 is forced down onto the fastener (see Fig. 8). The die 32 is provided with a central opening 34 and an annular die face 36 which is generally concave with an inclined camming portion 38 extending peripherally about the central opening therein. When the die is lowered onto the fastener, the camming surface 38 circumferentially engages the upper edge of the attaching portion 20 and turns it outwardly. As the die is lowered further, the fastener portion 16 is free to enter the central die opening 34, and the attaching portion is turned completely outwardly until it bears against the side 40 of the supporting sheet. The fastener is thereby provided with a continuous rim 42 on the side of the sheet opposite the flange 18, so that the portion of the sheet adjacent the opening is securely retained therebetween. The attaching operation may be facilitated by the application of heat to the fastener, the attaching tools, or both, during the attachment.

Figure 4:
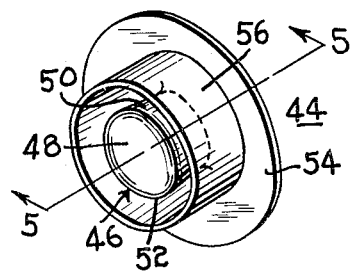
Fig. 4 is a perspective view of a snap fastener stud member embodying the features of the invention.
Figure 5:
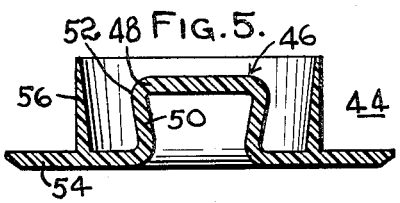
Fig. 5 is a view in section taken on line 5—5 of Fig. 4.

Referring now to Figs. 4 and 5, there is shown a snap fastener stud member 44 embodying the features of the invention. In this case the central fastening portion 46 is shaped to provide a stud portion 48 having outwardly inclined walls 50 to form a shoulder 52. The construction of the rest of the fastener is similar to that of the fastener 10. A flange 54 is provided about the fastening portion, and an integral attaching wall 56 is disposed on the flange about the fastening portion 46. The method of attachment of the stud member 44 to a supporting sheet is substantially identical with the method described above in connection with the snap fastener member 10.

Both the socket and the stud fasteners may be so constructed as to be capable of assembly in the same dies. If required, heat may be applied during assembly by heating the dies, or by providing separate external heating means.

The term "snap fastener portion" as used herein is intended to mean either a stud or socket of the type illustrated and described.

Since certain obvious modifications may be made in the device without departing from the scope of the invention, it is intended that all matter contained herein be interpreted in an illustrative and not in a limiting sense.

I claim:

1. A one piece fastening device for assembly onto a supporting sheet through an opening therein, said device being formed of a synthetic organic thermoplastic material and comprising a base having a central snap fastener portion projecting therefrom, a substantially flat continuous imperforate flange disposed about the snap fastener portion, and continuous imperforate attaching means integral with and extending upwardly from the flange in spaced relation to the periphery thereof, and in spaced relation to the snap fastener portion, whereby said attaching means is disposed to enter the opening in the supporting sheet from one side thereof when the fastening device is assembled thereon, said attaching means being capable of being turned outwardly during assembly so that the sheet is confined between said attaching means and the flange, and having a height substantially as great as the width of the portion of the flange outside the attaching means.

2. A snap fastener assembly, comprising a supporting sheet having an opening therethrough and a snap fastener assembled therewith, said snap fastener being formed of a single piece of molded synthetic organic thermoplastic material and comprising a base having a snap fastener portion projecting therefrom, a continuous imperforate flange portion extending about the snap fastener portion, said flange being disposed against one side of the supporting sheet, an imperforate attaching wall integral with the flange disposed thereon in spaced relation to the periphery of the flange and to the snap fastener portion, said imperforate attaching wall extending substantially continuously about the snap fastener portion, said attaching wall extending through the opening from said one side of the sheet and being turned outwardly on the other side of the sheet to form a substantially continuous imperforate rim having a diameter substantially as great as that of the flange, whereby the portion of the sheet disposed about the opening is confined between said rim and the flange.

3. A one-piece fastening device for assembly onto a supporting sheet through an opening therein, said device being formed of a synthetic organic thermoplastic material and comprising a base having a central snap fastener portion projecting therefrom, a substantially flat continuous imperforate flange disposed about the snap fastener portion, and a continuous imperforate attaching wall integral with and extending upwardly from the flange in spaced relation to the periphery thereof, and to the snap fastener portion, whereby when said attaching wall is inserted through a support opening and flattened thereagainst, the flange and the wall cooperate to form continuous imperforate fastener retaining means on both sides of the support.

4. A one-piece fastening device for assembly onto a supporting sheet through an opening therein, said device being formed of a relatively rigid material capable of plastic deformation and comprising a base and a central snap fastener portion protruding therefrom, a substantially flat continuous imperforate flange disposed about the snap fastener portion, and a continuous imperforate attaching wall integral with and extending upwardly from the flange in spaced relation to the periphery thereof, and to the snap fastener portion, whereby when said attaching wall is inserted through a support opening and flattened thereagainst, the flange and the wall cooperate to form continuous imperforate fastener retaining means on both sides of the support and said snap fastener portion protrudes from the plane of the support.

5. A one-piece snap fastening device for assembly onto a supporting sheet through an opening therein, said device being formed of a relatively rigid synthetic organic thermoplastic material capable of plastic deformation, and comprising a base, a continuous imperforate attaching wall integral with and extending from the plane of the base in spaced relation to the periphery thereof, and a snap fastener portion disposed centrally of the attaching wall, said snap fastener portion comprising an imperforate wall portion extending from the plane of the base and having means for receiving a cooperating snap fastener portion in snapping engagement, whereby when said attaching wall is inserted through a support opening and turned outwardly against the support, the flange and the attaching wall cooperate to form continuous imperforate fastener retaining means on both sides of the support and said snap fastener portion extends from the plane of the support.

References Cited in the file of this patent

UNITED STATES PATENTS

| | | |
|---|---|---|
| 776,957 | Stirckler | Dec. 6, 1904 |
| 780,510 | Lane | Jan. 24, 1905 |
| 1,122,280 | Kempshall | Dec. 29, 1914 |
| 2,368,100 | Boenecke | Jan. 30, 1945 |
| 2,550,788 | De Swart | May 1, 1951 |
| 2,585,897 | Johnson | Feb. 12, 1952 |

FOREIGN PATENTS

| | | |
|---|---|---|
| 116,256 | Switzerland | Sept. 1, 1926 |
| 254,917 | Great Britain | July 15, 1926 |
| 400,870 | France | June 26, 1909 |